US010534939B1

(12) United States Patent
Bellows

(10) Patent No.: US 10,534,939 B1
(45) Date of Patent: Jan. 14, 2020

(54) SYSTEMS AND METHODS FOR MANAGING A POPULATION OF RFID TAGS

(71) Applicant: Zebra Technologies Corporation, Lincolnshire, IL (US)

(72) Inventor: David Bellows, Old Westbury, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/226,375

(22) Filed: Dec. 19, 2018

(51) Int. Cl.
*G06K 7/10* (2006.01)

(52) U.S. Cl.
CPC ..... *G06K 7/10099* (2013.01); *G06K 7/10029* (2013.01); *G06K 7/10336* (2013.01); *G06K 7/10356* (2013.01)

(58) Field of Classification Search
CPC ............. G06K 7/0008; G06K 7/10039; G06K 7/10316; G06K 7/10336; G06K 7/10356
See application file for complete search history.

(56) References Cited

U.S. PATENT DOCUMENTS 6,367,697 B1   4/2002  Turner et al.
2010/0277286 A1*  11/2010  Burkart ............. G06K 19/0701
                                                            340/10.34

* cited by examiner

*Primary Examiner* — Omeed Alizada
(74) *Attorney, Agent, or Firm* — Yuri Astvatsaturov

(57) ABSTRACT

A system and method for managing a population of RFID tags. In various aspects, an RFID reader implements one or more RFID protocols to execute a read cycle that defines a series of actions for the RFID reader to perform. The read cycle may begin by the RFID reader broadcasting a query to deselected RFID tags to generate a list of deselected tag identifiers. The read cycle then causes the RFID reader to broadcast a query to selected RFID tags to track selected RFID tags. Finally, the read cycle causes the RFID reader to broadcast a selection command that includes the list of deselected tag identifiers.

29 Claims, 5 Drawing Sheets

SYSTEMS AND METHODS FOR MANAGING A POPULATION OF RFID TAGS

BACKGROUND OF THE INVENTION

Warehouses, retail spaces, or other venues often employ Radio Frequency Identification (RFID) technology to track various objects located therein. For example, products, packages, assets, vehicles, people, scanners, and robots may all be tagged with an RFID tag. An RFID positioning system located in the venue may then track the location of tagged objects as the objects traverse the venue.

Common RFID standards define several different protocols at which RFID readers may operate. However, as the RFID tag population grows large, the number of responses transmitted by the RFID tags becomes too voluminous for the positioning system. As a result, the RFID positioning system is unable to detect (and therefore track) all of the RFID tags in the environment. Accordingly, there is a need for systems and methods for managing a population of RFID tags.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
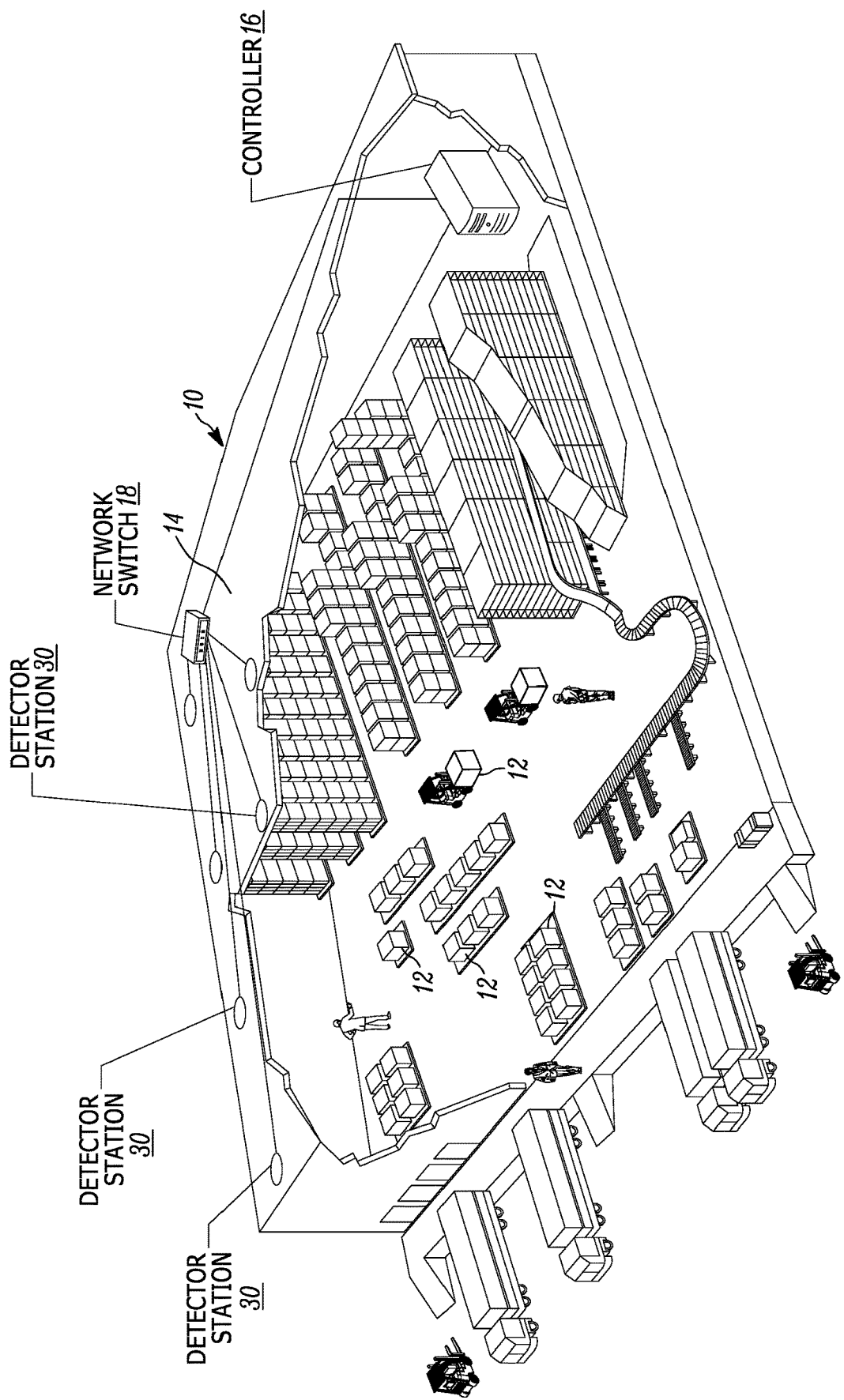
FIG. 1 is a perspective view of a venue illustrating an arrangement for which a Radio Frequency Identification (RFID) positioning system within the venue is deployed, in accordance with an example.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Embodiments of the present disclosure include methods and systems for managing a network of radio frequency identification (RFID) readers. The system may include a plurality of detector stations, such as fixed overhead detector stations, disposed throughout a venue. Each of the detector stations may include an RFID reader configured to implement one or more RFID protocols, wherein each protocol (i) is associated with a first state and a second state, and (ii) when an RFID tag responds to a query generated by the RFID reader, the RFID tag alternates between the first and second states, and each RFID tag is configured with a selection flag that is associated with one of a selected status or a deselected status. Accordingly, RFID tags respond to the query when a state of the queried RFID tag matches both a state of the RFID reader for the protocol queried and, if included in the query, a selection status indicator. The RFID protocols include a first protocol where queried RFID tags in the matching state change to the other state for a duration of a timeout period and return to the matching state upon expiration of the timeout period; and a second protocol and a third protocol wherein RFID tags in the matching state change to the other state until (1) queried by an RFID reader in the other state, or (2) when the queried RFID tag is in the second state and the queried RFID tag loses RF power for a threshold duration. The system may also include a controller operatively connected to the plurality of detector stations. During the read cycle, the RFID reader is configured to broadcast a first query using the first protocol and a selection status indicator associated with the deselected status. In response, the RFID reader is configured to detect a plurality of responses to the first query respectively corresponding to a plurality of RFID tags. Each response may include an identifier associated with the responding RFID tag. Additionally, the RFID reader may be configured to broadcast a second query using the second and third protocols and a selection status indicator associated with the selected status. The RFID reader is also configured to broadcast a selection command. As described herein, transmitting the selection command causes RFID tags that responded to the first query to switch their respective selection flag from the deselected status to the selected status.

More particularly, the RFID readers may execute a read cycle in which the RFID reader queries RFID tags within its RF footprint (i.e., the read range). The read cycle may be defined by the transmission of one or more queries and how long the RFID reader awaits responses and/or process the responses. Said another way, the read cycle may be defined by a dwell time for different modes of operation. To this end, the read cycle may include an indication of a sequence of modes of operation and the dwell time the RFID reader should spend in each mode of operation included in the sequence. The RFID reader may then continuously execute the read cycle to track the position of the RIFD tags within the RFID reader's RF footprint.

In various embodiments, RFID positioning systems implement standards that define a communication scheme between RFID readers and RFID tags. Common RFID standards, such as EPC™ Radio-Frequency Identity Protocols Generation-2 UHF RFID Version 2.0.0 and ISO/IEC 18000-6, define four different protocols that may be implemented by RFID positioning systems. Additionally, the common standards include two states, referred to as State A and State B, for each of the protocols. An RFID tag's default state (i.e., when the tag is first powered up) for each protocol, or session, is A. The session and state may be implemented at an RFID reader or an RFID tag by setting an inventoried flag value for each session. Similarly, RFID tags may include a memory location at which an indication of the inventoried flag for each session is stored. Accordingly, the RFID reader may configure broadcasted queries to include an indication of a session and state value. In response, RFID tags may analyze the broadcasted query to detect the included session and state. If the state of the RFID tag for the session queried matches the indicated state included in the broadcasted query, the RFID tag responds to the query by transmitting an identifier associated with the RFID tag. Additionally, the RFID tag performs one or more other actions depending on the session (i.e., protocol) associated with the query.

According to the common standards, when an RFID tag responds to a query from an RFID reader set in the same session and state as the tag, the RFID tag alternates states. That is, RFID tags in State A switch to State B for that session upon responding to a query, and RFID tags in State B switch to State A for that session upon responding to a query. Additionally, in embodiments in which passive RFID tags are implemented, if an RFID tag in State B loses RF power for a threshold duration (such as 2 seconds, 5 seconds, 10 seconds, etc.), the RFID tag may be reset to State A.

Turning now to the different protocols, in an initial protocol, referred to as Session 0, RFID tags always respond to a query by an RFID reader. In another protocol, referred to as Session 1, when an RFID tag responds to a query, the RFID tag initiates a wait timer (typically under 5 seconds). In embodiments described herein, when the wait timer expires, the RFID tag will toggle back to its original state. For example, if a Session/State 1A RFID tag responds to a query by a Session/State 1A reader, the RFID tag will switch to Session/State 1B during the wait time. Thus, the RFID tag will not respond to any additional queries indicating a Session/State 1A reader. Once the wait timer expires, the RFID tag switches back to Session/State 1A. Accordingly, the RFID tag will respond to a subsequent query from a Session/State 1A RFID reader.

The common RFID standards also define two complementary protocols, referred to as Session 2 and Session 3. In Session 2 and Session 3, when an RFID tag responds to a query from an RFID reader set in the same state as the RFID tag for that session, the RFID tag will flip to the other state and stay there until the RFID tag responds to a query by an RFID reader in the other state for that session or, if the RFID tag flipped to State B, until the RFID tag loses RF power for a threshold duration. Generally, for the RFID tag to be able to detect a query from an RFID reader in the other state for the same session, the RFID tag must be transported to be within the RF footprint of another RFID reader. That is, generally, an RFID tag affixed to a stationary object will not respond to subsequent Session 2 or Session 3 queries (so long as it receives RF power). To reduce the time it takes for mobile RFID tags to respond to queries, RFID positioning systems that implement Session 2 and/or Session 3 typically configure RFID readers to form an alternating pattern (e.g., a checkerboard pattern) of Session/State 2A and Session/State 2B readers and/or Session/State 3B and Session/State 3A readers, respectively. This combination of sessions/states quiets down the static RFID tags local to each reader while they maintain RF power, allowing the opportunity for new RFID tags that enter each reader's RF footprint to be more easily read. Once these tags are read in Session 2 and/or Session 3, as long as these tags maintain RF power, these new RFID tags will remain quiet for these respective sessions until they are moved to another alternating square of the checkerboard setup.

In addition to the aforementioned sessions and states, the common standards support a selection flag. Accordingly, each RFID tag may store a flag that indicates whether the RFID tag is in a selected or deselected state. By default, when an RFID tag powers up, it is in a deselected state. Unlike the inventoried state indicators, the selection flag applies across all sessions. Accordingly, a query broadcasted by an RFID reader may include an indication of a selection status (either selected, deselected, or all tags). Consequently, only RFID tags that match the session and state, as well as the selection status, respond to the query. In embodiments in which passive RFID tags are implemented, if an RFID tag in the selected state loses RF power for a threshold duration (such as 2 seconds, 5 seconds, 10 seconds, etc.), the RFID tag may be reset to the deselected state.

The common standards support RFID readers broadcasting a selection command and a deselection command to RFID tags. In response to the receiving the command, the RFID tag sets the selection status to the selected or deselected state, respectively. The selection commands may also support the inclusion of a list of RFID tag identifiers or partial RFID tag identifiers (also called a "mask"). When the selection or deselection command includes a mask, only RFID tags that are associated with an identifier included in the mask respond to the command.

In some scenarios, there are too many RFID tags in the RF footprint of an RFID reader for the RFID reader to process all the query responses fast enough, particularly in Session/State 1A. When a tag is read in Session/State 1A, it flips to Session/State 1B for a relatively brief wait time (typically 0.5 seconds to 5 seconds), during which the tag is quieted down and not read again by a Session/State 1A RFID reader. As soon as the wait timer expires, the tag is available to be read again in Session/State 1A. This creates a situation in a densely tagged environment where most of the large quantity of tags continually compete for air time on the RFID reader, thereby saturating the RFID reader. In these scenarios, not every RFID tag will be read, and as a result, the objects with which these unread RFID tags are associated will not be properly tracked. Said another way, in these scenarios, the RFID reader's read rate cannot keep up with the volume of RFID tags within its read range, thereby causing the RFID positioning system to be unable to determine the location for all the RFID tags in its vicinity.

In high-density RFID tag environments, it is beneficial to focus processing on tags in Session/State 1A that are likely in motion because these are the tags that are most likely to be of interest or have the most business relevance. Focusing on these moving tags is more important than attempting to read stationary tags repetitively. As described herein, when an RFID reader operates in Session 2 and/or Session 3, generally only RFID tags that moved from the RF footprint of another RFID reader from an alternating square of the checkerboard setup to the RF footprint of the current RFID reader will be read. A read in Session 2 and/or Session 3 can therefore indicate that the tag is moving and is therefore of interest. Accordingly, in one approach, the RFID reader may be configured to generate a mask of RFID tag identifiers detected during Session 2 and/or Session 3. Subsequently, the RFID reader may be configured to broadcast a selection command that includes the mask. As a result, by configuring the Session/State 1A query to include a selection status indicator associated with the selected status, only the moving RFID tags respond to this query, reducing the volume of responses the RFID reader needs to process and increasing the likelihood that all (or at least 80%) of the RFID tags of interest are tracked during Session/State 1A.

It should be appreciated that while this use of the selection command works well in small environments that only have a few RFID readers, it may not be optimal for larger environments (e.g., environments that have nine or more RFID readers). In particular, the RF footprint associated with an RFID reader has overlapping RF footprints with other, neighboring RFID readers. Thus, RFID tags that are located in an overlapping region are receiving commands from two or more RFID readers. This volume of commands tends to overload the RFID tag processor, causing the RFID tag to fail to respond to a selection command, despite the RFID tag identifier being included in the mask.

During testing, applying the above approach in a larger environment results in about only half of the moving RFID tag population, which is comprised of the tags of interest, successfully responding to the selection command thereby enabling those RFID tags to be read in response to a Session/State 1A query that includes a selected status indicator. This is caused, in part, by the inherent RF footprint overlap between neighboring RFID readers. Additionally, multipath effects and reflections in the environment also contribute to the RF footprint overlap of multiple RFID readers. RFID tags located in these overlap regions will respond, for example, to the Session/State 2A query from a first RFID reader and the subsequently transmitted Session/State 2B query from a second RFID reader. The same holds true for a Session/State 3A query from a first RFID reader and a subsequently transmitted Session/State 3B query from a second RFID reader. Moreover, the same tags may concurrently be within the RF footprint of a Session/State 1A query. These tags are therefore inundated by multiple readers broadcasting different commands, making these RFID tags less likely to successfully respond to a selection command.

Instead, the RFID tags that are more likely to be able to receive and process a selection command are those that are the easiest to read. In most cases, these are stationary RFID tags. Other RFID tags may simply be located in a particular location in the environment associated with strong RF signal characteristics, such as being close to a reader or readers. Yet other RFID tags may be inherently more sensitive to RF signals or be oriented in a way relative to an RFID reader that makes them more conducive to communicating with that RFID reader. Generally, these easy-to-read tags are repeatedly read in Session/State 1A, preventing the RFID reader from reading the more difficult-to-read RFID tags that are in motion during Session/State 1A.

Accordingly, in these larger environments, the RFID readers may be adapted to target harder-to-read RFID tags by quieting the easiest-to-read RFID tags. More particularly, the RFID reader may be configured to broadcast a Session/State 2A or Session/State 2B or Session/State 3A or Session/State 3B query including a deselected status indicator. RFID tags that respond will be detected by the RFID reader for inclusion in a mask transmitted as part of a selection command. The easiest-to-read RFID tags will be successfully selected, and thus, when the RFID reader broadcasts the next Session 2 or Session 3 query, the easier-to-read RFID tags will have the selected status and not respond to the query. As a result, the RFID reader is better able to read and/or process the responses from the harder-to-read RFID tags. Said another way, in the modified approach, the RFID reader is configured to quiet the loudest RFID tags by filtering them out of the Session 2 and Session 3 population.

Instead, these tags are isolated to be read in Session/State 1A with the selected status. This, in turn, enables the RFID reader to read the harder-to-read RFID tags more often in Session 2 and Session 3, thereby enabling the RFID reader to better track these harder-to-read RFID tags.

In dense tag environments not configured to utilize this technique, roughly half of the tag reads (across a plurality of read cycles) correspond to only 10% of the unique RFID tags read. Thus, using Session/State 1A to read RFID tags without implementing the techniques disclosed herein results in a small percentage of the RFID tags getting read repetitively, accounting for much more time of the RFID readers than is desired. However, by applying the techniques described herein, more than about 90% of the top 10% of unique RFID tags get read; and of that about 90%, less than 10% of the unique RFID tags are read in Session 2 or Session 3. This shows that the easy-to-read tags are being selected, and thereby segregated, and are not consuming time on the RFID readers in Session 2 or Session 3. Consequently, the proportion of the overall number of tag reads corresponding to the loudest 10% of unique RFID tags drops from roughly half to about a third. In other words, by broadcasting the Session 2 and/or Session 3 query using a deselected status indicator, the RFID reader is able to read (and therefore track) more RFID tags in the environment than conventionally possible.

It should be appreciated that these techniques account for RFID tags losing their selected status due to a loss of RF power for a threshold duration. By definition, when the RFID tag loses RF power, it is no longer an easy-to-read tag and should therefore not be categorized as such nor maintain its selected status. If the RFID tag becomes easy-to-read again, it will naturally get selected again. Thus, the techniques disclosed herein automatically select the RFID tags that should be selected, rendering it unnecessary to manually formulate, create, and/or manage a list of tags to target for selection or to attempt to manually reselect an RFID tag that lost its selected status when it lost RF power.

Additional techniques may be implemented to further increase the likelihood that an RFID reader is able to read the harder-to-read RFID tags. In some embodiments, the RFID reader does not include a single antenna, but a plurality of radially distributed antennas. Thus, depending on the active antenna, the RFID reader may detect a different set of responses and/or be able to select a different set of RFID tags.

As described above, the easier-to-read RFID tags are more likely to be selected compared to the harder-to-read RFID tags. Generally, broadcasting the selection command via the same antenna that broadcasted the query used to populate the mask tends to select the easier-to-read RFID tags. However, it would be even more desirable if the RFID tags that are successfully selected are limited to the utmost easiest tags to read. Accordingly, embodiments described herein generate the mask based on responses received at a first antenna and broadcast the selection command over a second antenna (e.g., the antenna one or two radial positions away). Consequently, because of the difference in coverage of the first antenna compared to the second antenna, the RFID reader is configured to broadcast the selection command in a manner that makes it more difficult for the easier-to-read RFID tags to respond, thereby increasing the likelihood that only the easiest-to-read RFID tags are selected.

In some implementations, the RFID reader is configured to switch which antenna is active during a read cycle. In these implementations, the read cycle may not only define the session and state in which the RFID reader operates, but also the particular antenna to utilize. For example, the read cycle may define a first antenna that broadcasts a query to generate a list of RFID tags to select, a second antenna that broadcasts a query to track selected RFID tags, and a third antenna that transmits the selection command that indicates the generated list.

Additionally or alternatively, the RFID reader may be configured to queue a mask for subsequent transmission by another antenna. In this scenario, when a particular antenna is active, the antenna is configured to broadcast a query and generate a mask that includes the identifiers included in the detected responses. The RFID reader then stores the generated mask in the queue. When the RFID reader utilizes another antenna to broadcast a selection command, the RFID reader obtains a queued mask that was generated by a previously active antenna during a prior read cycle.

Additional approaches to increase the ability to read RFID tags include switching how Sessions 2 and 3 and Session 1 are utilized. That is, instead of using Sessions 2 and 3 to select RFID tags and Session/State 1A to track the selected RFID tags, in these approaches, the RFID reader is configured to select RFID tags using Session/State 1A and to track selected RFID tags using Sessions 2 and 3. When using Sessions 2 and 3 to generate a list of RFID tags to select and then read and track those selected tags in Session/State 1A, the read rate of those selected RFID tags in Session/State 1A is not as robust as the higher read rate for the deselected RFID tags read in Sessions 2 and 3. While the overall, or composite, read rate may be higher when using these techniques as compared to conventional techniques, the deselected RFID tags are read more frequently than selected RFID tags. As described herein, in Session 1, all RFID tags are configured to respond (assuming the wait timer has expired). Accordingly, during Session/State 1A, the RFID reader generally receives more responses than in Sessions 2 or 3. Thus, especially due to the selection of the easiest-to-read or loudest tags which are now being read in Session/State 1A, it is more likely that the RFID reader is unable to track all of the RFID tags when Session/State 1A is used to track the selected RFID tags. Therefore, when the RFID reader is instead configured to select RFID tags using Session/State 1A and to track selected RFID tags using Sessions 2 and 3, the number of RFID tags responding to the RFID reader is more balanced between Session 1 and Sessions 2 and 3. Accordingly, the RFID reader is configured to implement Session 1 to read deselected RFID tags (which does not include the loudest tags because they are selected quickly), and the RFID reader is configured to implement Sessions 2 and 3 to read the easiest-to-read tags. Thus, the number of reads per RFID tag is reduced, as described herein. As a result, the likelihood that the RFID reader is able to read all of the RFID tags in the environment is increased.

As another benefit of this approach of configuring the RFID reader to select RFID tags using Session/State 1A and to track selected RFID tags using Sessions 2 and 3, a quiet down period is not needed when the system is started up because there are no RFID tags to quiet down. That is, because Session 2 and Session 3 are used only to read already selected RFID tags; reads in Session 2 and 3 have no criteria on which to select tags. Accordingly, a quiet down period is unnecessary.

On the contrary, when Sessions 2 and 3 are used to select RFID tags, the positioning system benefits from an initial quiet down period, during which the RFID readers only broadcast respective queries having a selection status indicator associated with all tags in Session 2 and Session 3. In this scenario, there are no Session 1 queries and no selection commands. Stationary RFID tags located within the RF footprint of only one RFID reader can be read up to one time per session, and as long as the stationary RFID tags maintain RF power, the stationary RFID tags stop responding to queries. Without this quiet down step, the RFID tag identifiers associated with these stationary RFID tags (which are not necessarily the loudest tags) would unnecessarily be added to the mask that is later included with the selection command. Said another way, in embodiments that require it, the quiet down period gives RFID tags the opportunity to be read and settle down in Session/State 2B and/or Session/State 3B before switching the RFID readers to the configuration where the RFID readers are configured to implement Sessions 2 and 3 to select RFID tags.

According to disclosed aspects, over time, the number of unique selected RFID tags may grow too large to track. Accordingly, to reduce the population of selected tags to a more manageable number, the RFID positioning system may be configured to periodically deselect all the RFID tags in the venue (e.g., overnight, or another time period associated with minimal traffic, or any other time that will have minimal impact on the tracking performance). To deselect all of the RFID tags, the RFID positioning system may be configured to push a deselection command to all RFID tags.

In another embodiment, the RFID positioning system may be configured to broadcast a modification to its read cycle. Using the approach where RFID tags are selected using Session/State 1A and selected RFID tags are tracked using Sessions 2 and 3, the second query still broadcasts using Sessions 2 and 3, with the selection status indicator associated with the selected status, and the RFID positioning system still detects a plurality of responses to the second query. However, the RFID reader then broadcasts a deselection command to deselect the RFID tags that responded to the second query thereby causing these RFID tags to switch their respective selection flag from the selected status to the deselected status. In this embodiment, only the selected RFID tags are targeted for deselection instead of the entire RFID tag population. Accordingly, in one approach, the RFID reader may be configured to generate a mask of RFID tag identifiers detected during Session 2 and/or Session 3. Subsequently, the RFID reader may be configured to broadcast a deselection command that includes the mask.

In yet another alternative embodiment, the RFID positioning system may be configured to simply stop radiating RF energy for a threshold amount of time, thereby causing the RFID tags to become de-energized. Consequently, when the RFID positioning system begins operation again, all of the RFID tags default to a deselected status.

FIG. 1 is a perspective view of a venue 10 illustrating an arrangement for which an RFID positioning system 14 within the venue 10 is deployed. Although the example venue 10 is illustrated as a warehouse, the disclosed embodiments may be implemented at other types of venues (such as a retail store, an airport, a stadium, a performance center, and so on). In the example embodiment of FIG. 1, RFID tags 12 are associated with various objects within the venue 10. For example, the RFID tags 12 may be affixed to packages, products, or other items disposed in the venue 10, embedded in devices carried or worn by venue occupants, included in communication units affixed to vehicles and/or robots that traverse the venue, and so on.

The example RFID positioning system 14 includes a plurality of detector stations 30 positioned throughout the venue 10. While FIG. 1 illustrates the detector stations 30 in a grid pattern, the particular dimensions of alternate venues 10 may necessitate other arrangements of detector stations 30. The detector stations 30 may include RFID readers 31 configured to execute a read cycle to communicate with the RFID tags 12. In some embodiments, the detector stations 30 may include other sensing devices, such as an image sensor or an ultra-wideband (UWB) sensor.

In the illustrated example, the venue 10 also includes a centralized controller 16, such as a networked host computer or server. The example centralized controller 16 may be configured to determine and/or adjust the read cycles executed by the RFID readers 31 within the detector stations 30. Accordingly, the example centralized controller 16 is connected to the plurality of detector stations 30 positioned throughout the venue 10 via a network switch 18. To this end, each of the detector stations 30 may be in either wired or wireless electronic communication with centralized controller 16 via the network switch 18. For example, in some embodiments, the detector stations 30 may be connected via Category 5 or 6 cables and use the Ethernet standard for wired communications. In other embodiments, the detector stations 30 may be connected wirelessly, using built-in wireless transceivers, and may use the IEEE 802.11 (WiFi) and/or Bluetooth standards for wireless communications. Other embodiments may include detector stations 30 that use a combination of wired and wireless communication.

In some embodiments, the centralized controller 16 configures the plurality of detector stations 30 to execute a plurality of read cycles, in accordance with the RFID tag 12 population management techniques described herein. In one example, the centralized controller 16 configures each of the plurality of detector stations to execute a read cycle during which the detector station 30 is configured to broadcast a first query in Session/State 1A for deselected RFID tags 12; generate a mask that includes the identifiers included in responses by the RFID tags 12 to the query; broadcast a second query using Session 2 and Session 3 to track selected RFID tags 12; and to broadcast a selection command to select the RFID tags 12 that correspond to an identifier included in the mask.

Figure 2:
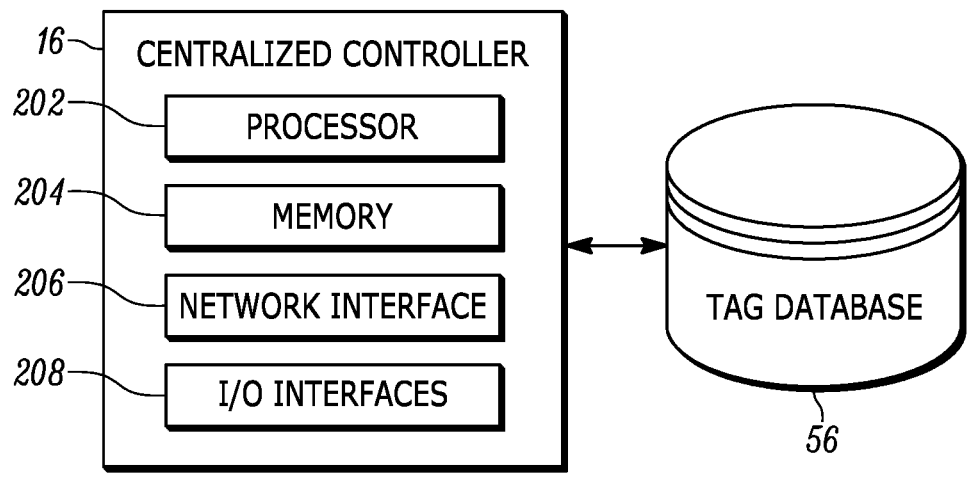
FIG. 2 is a block diagram representative of an embodiment of a centralized controller of FIG. 1, in accordance with an example embodiment.

FIG. 2 is a block diagram representative of an embodiment of the centralized controller 16 of FIG. 1. The centralized controller 16 is configured to execute computer instructions to perform operations associated with the systems and methods as described herein. The centralized controller 16 may implement enterprise service software that may include, for example, Restful (representational state transfer) API services, message queuing service, and event services that may be provided by various platforms or specifications, such as the J2EE specification implemented by any one of the Oracle WebLogic Server platform, the JBoss platform, or the IBM Web Sphere platform, etc.

The example centralized controller 16 of FIG. 2 includes a processor 202, such as, for example, one or more microprocessors, controllers, and/or any suitable type of processor. The example centralized controller 16 of FIG. 2 further includes memory (e.g., volatile memory or non-volatile memory) 204 accessible by the processor 202, for example, via a memory controller (not shown). The example processor 202 interacts with the memory 204 to obtain, for example, machine-readable instructions stored in the memory 204 corresponding to, for example, the operations described by this disclosure. Additionally or alternatively, machine-readable instructions corresponding to the example operations described herein may be stored on one or more removable media (e.g., a compact disc, a digital versatile disc, removable flash memory, etc.), or over a remote connection, such as the Internet or a cloud-based connection, that may be coupled to the centralized controller 16 to provide access to the machine-readable instructions stored thereon.

The example centralized controller 16 of FIG. 2 may further include a network interface 206 to enable communication with other machines via, for example, one or more computer networks, such as a local area network (LAN) or a wide area network (WAN), e.g., the Internet. The example network interface 206 may include any suitable type of communication interface(s) (e.g., wired and/or wireless interfaces) configured to operate in accordance with any suitable protocol(s), e.g., Ethernet for wired communications and/or IEEE 802.11 for wireless communications.

The example centralized controller 16 of FIG. 2 includes input/output (I/O) interfaces 208 to enable receipt of user input and communication of output data to the user, which may include, for example, any number of keyboards, mice, USB drives, optical drives, screens, touchscreens, etc.

The example centralized controller 16 of FIG. 2 is operatively connected to a tag database 56 that stores information associated with a plurality of RFID tags 12 detected by an RFID positioning network 14 at the venue 10. A stored record for a particular RFID tag 12 may include an identifier of the RFID tag 12, a latest location and timestamp for the RFID tag 12, an identifier of the RFID reader 31 in communication with the RFID tag 12, an identifier of the specific antenna or virtual antenna in detector station 30 in communication with the RFID tag 12, a set of historical locations for the RFID tag 12, state(s) and/or session(s) and/or selection status for the RFID tag 12, and so on. Additionally, the tag database 56 may store information about a plurality of RFID readers 31 included in detector stations 30. For example, a stored record for a particular RFID reader 31 may include an identifier of the RFID reader 31, an identifier of each RFID tag 12 within the RF footprint of the RFID reader 31, a location of the RFID reader 31, information that defines a read cycle for the RFID reader 31, and so on. It will be appreciated that although FIG. 2 illustrates the tag database 56 as being external to the example centralized controller 16, other example centralized controllers 16 may internally include the tag database 56.

Figure 3:
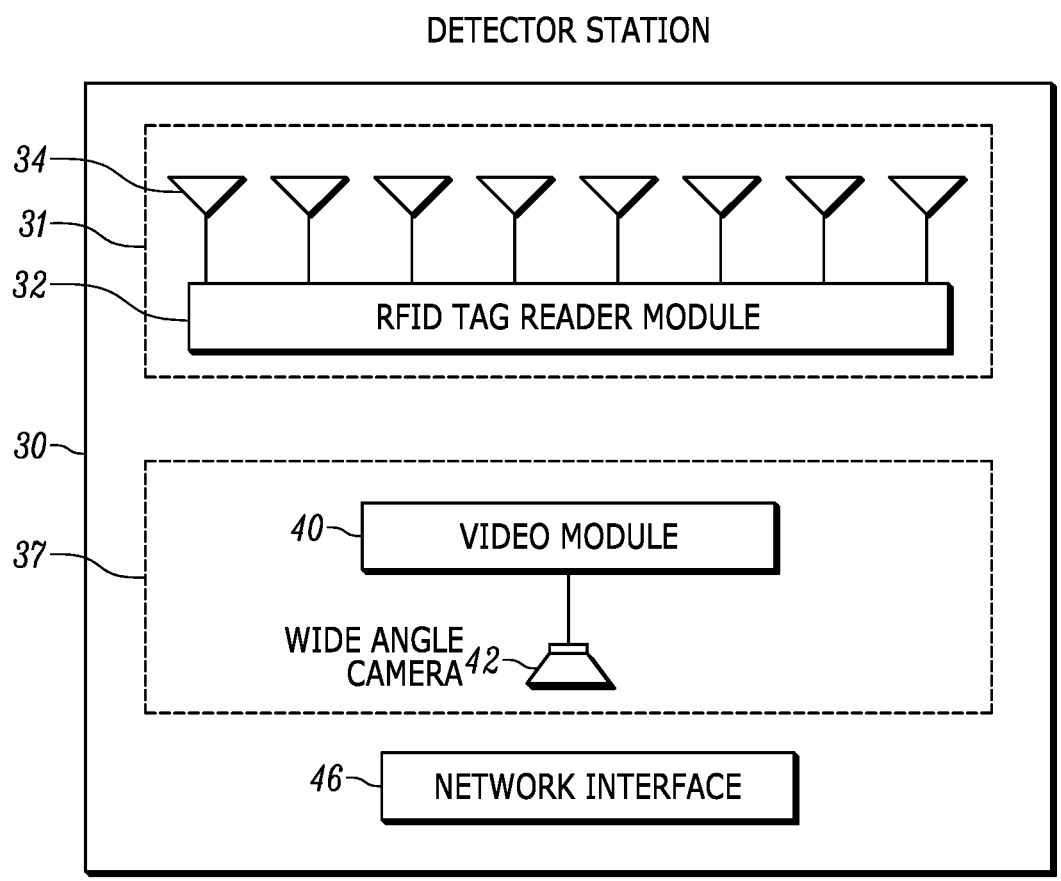
FIG. 3 is a block diagram illustrating an example implementation of a detector station, as may be used in the venue of FIG. 1, in accordance with an example embodiment.

FIG. 3 is a block diagram illustrating an example implementation of an embodiment of a detector station 30. In the illustrated example, the detector station 30 includes two example detectors 31 and 37, as further described herein. For example, a detector in the form of an RFID reader 31 is operative for reading the RFID tags 12 affixed to and/or embedded in objects within the venue 10.

More particularly, as shown in FIG. 3, each RFID reader 31 includes an RFID tag reader module 32 that has a controller, a memory, and an RF transceiver. The controller of the RFID tag reader module 32 may be configured to interact with the memory to obtain, for example, machine-readable instructions stored in the memory corresponding to, for example, the operations represented by the flowcharts of this disclosure. The RFID tag reader module 32 is operatively connected to a plurality of RFID antenna elements 34, which are energized by the RFID module 32 to radiate RF energy (also referred to herein as a beam) over an antenna beam pattern. As those of skill will recognize, an antenna and its beam pattern may be characterized by the antenna's beamwidth (i.e., the antenna's half power beamwidth). The RFID reader 31 is operated, under the control of the RFID module 32, to transmit RF beam or wave energy to the RFID tags 12, and to receive RF response signals from the RFID tags 12, thereby interrogating and processing the payloads of the RFID tags 12 that are in read range of the RF transceiver. The RFID read range for a detector station 30 may be a 360° zone defined by the RFID antenna elements 34 and their collective beam patterns. In various embodiments, a detector station 30 may include eight RFID antenna elements 34, each maintained in a fixed position and each having a beam pattern extending in a different direction. In other embodiments, a detector station 30 may include a phased-array antenna that is steerable (electronically and/or mechanically) to produce a beam pattern that extends in one of eight (or more) pre-defined angles. During operation, the RF transceiver may capture RFID tag information (e.g., an Electronic Product Code (EPC)) that identifies RFID tags 12 disposed in the venue 10.

The RFID antenna elements 34 determine a signal strength for the data received from the RFID tags 12. The comparative signal strengths at each RFID antenna element 34 of a particular detector 30 are used to determine the location (i.e., position) and/or direction of travel of the RFID tag 12, using a suitable locationing/positioning technique, such as triangulation, trilateration, multilateration, etc. Such locationing and direction of travel may be determined by analyzing data from multiple detector stations 30 and the centralized controller 16. The example centralized controller 16 stores the determined location of the RFID tags 12 in the RFID tag database 56.

The example detector station 30 is configured to cause the RFID reader 31 to execute a read cycle. In some embodiments, the read cycle is defined by a plurality of indications defining, for example, one or more modes of operation for the RFID reader 31, a dwell time the RFID reader 31 spends in each mode of operation, and/or when to broadcast a query and/or a command. As described herein, the read cycle may also define a particular RFID antenna element that is to be utilized for each portion of the read cycle. The RFID module 32 may include local storage that stores the indications that define the read cycle. In some embodiments, the detector station 30 may be configured to receive updates to the read cycle from the centralized controller 16. Accordingly, upon detecting an update from the centralized controller 16, the detector station 30 may update the locally stored indications of the read cycle at the RFID module 32.

In embodiments in which the RFID tags 12 include a passive RFID tag, the RFID tag 12 may be energized by the RF beam emitted from the detector stations 30. Accordingly, in these embodiments, the RIFD tag 12 does not need to include a power source to transmit RFID tag information back to the detector stations 30. As a result, the RIFD tags 12 may be manufactured at a sufficiently low cost to make it economical for the RFID tags 12 to be affixed to or embedded in a large number of objects at the venue 10. Additionally, the lack of a power source also enables the RFID tags 12 to be used over a longer period of time as there is no depletable power source. That said, the RFID tags 12 may still include active RFID tags that have their own power source to enable higher transmit powers that facilitate more accurate position determination.

In the illustrated example of FIG. 3, the detector station 30 may further include a video detector 37 operative for detecting or locating a target by capturing image data indicative of a target in the venue 10, such as a group member moving through venue 10. More particularly, the video detector 37 may be mounted in each detector station 30 and may include a video module 40 having a camera controller that is connected to a camera 42, which may be, for example, a wide-angle field of view camera for capturing the image of a target. In some embodiments, the camera 42 may be a high-bandwidth video camera, such as a moving picture expert group (MPEG) compression camera. In some embodiments, the camera may include wide-angle capabilities such that camera 42 would be able to capture images over a large area to produce a video stream of the images. As referred to herein, the image capture devices or video cameras (also referred to as image sensors herein) are configured to capture image data representative of the venue or an environment of the venue. Further, the image sensors described herein are example data capture devices, and example methods and apparatuses disclosed herein are applicable to any suitable type of data capture device(s). In various embodiments, the images or data from the images may be time-stamped and synchronized or fused with other data, such as RFID data, and used to further describe, via data, the venue 10 or environment of the venue 10. Such synchronized or fused data may be used, for example, by the centralized controller 16 to verify the accuracy of the count and/or ensure proper operation of the RFID positioning system.

Any of the detector stations 30, including alone, together, or some combination thereof, may transmit electronic information, including any RFID, image, or other information, to the centralized controller 16 for processing. For example, the central controller 16 of FIG. 1 may include a network communication interface 206 communicatively coupled to network communication interfaces 46 of the detector stations 30 to receive sensing detector data, such as RFID information, and image data, such as a video stream from the wide-angle camera 42. The detector stations 30 may also receive information, commands, or execution instructions, including requests to provide additional sensory or detection information from the centralized controller 16, in order to perform the features and functionality as described herein.

Figure 4:
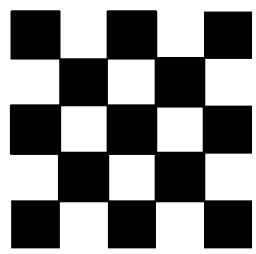
FIG. 4 is an illustration of read cycles for an RFID reader that may be implemented within the venue of FIG. 1.

FIG. 4 is an illustration of read cycles for an RFID reader 31 that may be implemented to manage the population of RFID tags 12 within the venue 10 of FIG. 1. It should be appreciated that although FIG. 4 references the common standards described above, other standards may be implemented in accordance with the illustrated techniques. In the illustrated representation, it should be appreciated that the length of the various segments is generally indicative of the length of a dwell time the RFID reader 31 spends in the indicated Session/State. The total time spent querying RFID tags 12 with a deselected status is approximately the same as the total time spent querying RFID tags 12 with a selected status. However, depending on the RFID tag 12 population of the specific venue, other embodiments may utilize a different ratio of time spent querying RFID tags 12 with a deselected status versus time spent querying RFID tags 12 with a selected status. As illustrated in FIG. 4, the lengths of dwell time associated with Session 2 and Session 3 are about the same.

Furthermore, it should be noted that the length associated with "Select" is not indicative of time. Instead, this length is used to indicate a relative time when the RFID reader 31 is configured to broadcast a selection command relative to the operations in the indicated sessions/states. In one embodiment, the dwell time for the selection command is a fixed duration. In another embodiment, the dwell time for the selection command is proportional to the number of identifiers included in the detected responses to the first query that are included in the mask for the selection command. In one example, the selection command dwell time is 2 milliseconds for every RFID tag identifier in the mask. Consequently, in this example, a list of 10 identifiers would result in a 20 millisecond dwell time, and a list of 20 identifiers would result in a 40 millisecond dwell time.

Generally, the centralized controller 16 divides the plurality of detector stations 30 into an alternating pattern (such as the illustrated "checkerboard" pattern). As illustrated, the alternating pattern is formed by an alternating arrangement of "white squares" and "black squares." Accordingly, the particular read cycle implemented by the RFID reader 31 may vary depending on whether the centralized controller 16 assigns the particular RFID reader 31 to be a "white square" or a "black square."

In the upper scenario, the centralized controller 16 configured the RFID reader 31 to implement a read cycle where the RFID reader 31 is configured to select RFID tags 12 for tracking while operating in Session/State 1A and to track the selected RFID tags 12 while operating in Sessions 2 and 3. Accordingly, the read cycle begins by the RFID reader 31 broadcasting a first query for deselected RFID tags 12 while operating in Session/State 1A. The RFID reader 31 then waits for the expiration of a Session/State 1A dwell time before broadcasting a second query for selected RFID tags 12 while operating in Sessions 2 and 3. More particularly, the RFID reader 31 is configured to divide the second query into an initial query broadcasted while operating in one of Session 2 or Session 3 and a subsequent query broadcasted while operating in the other of Session 2 or Session 3. As illustrated, the particular session and state the RFID reader 31 is configured to operate in during the initial and subsequent queries vary depending on whether the controller 16 assigned the RFID reader 31 to be a "white square" or a "black square." Further, although FIG. 4 illustrates the "black square" RFID reader 31 being configured to operate in Session/State 2B for the initial query and Session/State 3A for the subsequent query and the "white square" RFID reader 31 being configured to operate in Session/State 3B for the initial query and Session/State 2A for the subsequent query, in other embodiments, the RFID reader 31 may operate in the opposite session/state for the initial query and the subsequent query (i.e., the "black squares" operate in Session/State 3A for the initial query and Session/State 2B for the subsequent query, and the "white squares" operate in Session/State 2A for the initial query and Session/State 3B for the subsequent query). In a third embodiment, the "black squares" may operate in the same session/state as in the second embodiment above (i.e., Session/State 3A for the initial query and Session/State 2B for the subsequent query), and the "white squares" may operate in the opposite session/state as in the second embodiment above (i.e., Session/State 3B for the initial query and Session/State 2A for the subsequent query). In a fourth embodiment, the "black squares" may operate in the same session/state as in the first embodiment above (i.e., Session/State 2B for the initial query and Session/State 3A for the subsequent query), and the "white squares" may operate in the opposite session/state as in the first embodiment above (i.e., Session/State 2A for the initial query and Session/State 3B for the subsequent query). After the second query, the read cycle includes the RFID reader 31 broadcasting a selection command indicating a list of RFID tag identifiers received during the Session/State 1A dwell time (either during the current or a prior read cycle).

Turning to the lower scenario, the centralized controller 16 configured the RFID reader 31 to execute a read cycle where the RFID reader 31 is configured to select RFID tags 12 for tracking while operating in Sessions 2 and 3 and to track the selected RFID tags 12 while operating in Session/State 1A. Accordingly, the read cycle begins by the RFID reader 31 broadcasting a first query for deselected RFID tags 12 while operating in Sessions 2 and 3. More particularly, the RFID reader 31 is configured to divide the first query into an initial query broadcasted while operating in one of Session 2 or Session 3 and a subsequent query broadcasted while operating in the other of Session 2 or Session 3. As illustrated, the particular session and state the RFID reader 31 is configured to implement during the initial and subsequent queries vary depending on whether the controller 16 assigned the RFID reader 31 to be a "white square" or a "black square." Further, although FIG. 4 illustrates the "black square" RFID reader 31 being configured to operate in Session/State 2B for the initial query and Session/State 3A for the subsequent query and the "white square" RFID reader 31 being configured to operate in Session/State 3B for the initial query and Session/State 2A for the subsequent query, in other embodiments, the RFID reader 31 may be configured to operate in the opposite session/state for the initial query and the subsequent query (i.e., the "black squares" operate in Session/State 3A for the initial query and Session/State 2B for the subsequent query, and the "white squares" operate in Session/State 2A for the initial query and Session/State 3B for the subsequent query). In a third embodiment, the "black squares" may operate in the same session/state as in the second embodiment above (i.e., Session/State 3A for the initial query and Session/State 2B for the subsequent query), and the "white squares" may operate in the opposite session/state as in the second embodiment above (i.e., Session/State 3B for the initial query and Session/State 2A for the subsequent query). In a fourth embodiment, the "black squares" may operate in the same session/state as in the first embodiment above (i.e., Session/State 2B for the initial query and Session/State 3A for the subsequent query), and the "white squares" may operate in the opposite session/state as in the first embodiment above (i.e., Session/State 2A for the initial query and Session/State 3B for the subsequent query). The RFID reader 31 then waits for the expiration of the Session 2 and Session 3 dwell times before broadcasting a second query for selected RFID tags 12 while operating in Session/State 1A. After the second query, the read cycle includes the RFID reader 31 broadcasting a selection command indicating a list of RFID tag identifiers received during the Session 2 and Session 3 dwell times (either during the current or a prior read cycle). In alternate embodiments, the RFID reader 31 may broadcast two separate selection commands, wherein the first command indicates a list of RFID tag identifiers received during one of the Session 2 or Session 3 dwell time and the second command indicates a list of RFID tag identifiers received during the other of the Session 2 or Session 3 dwell time. These two commands may either be consecutive or may be separated by one or more queries in the sequence. For example, the first selection command may occur prior to the second query, which operates in Session/State 1A for selected RFID tags 12. This selection command may indicate a list of RFID tag identifiers received during the initial query of the first query. In the this example, the second selection command may occur after the second query, which operates in Session/State 1A for selected RFID tags 12. This selection command may indicate a list of RFID tag identifiers received during the subsequent query of the first query.

It should be appreciated that while FIG. 4 illustrates the dwell times for Session/State 1A being roughly equal to the total dwell times for Sessions 2 and 3, in other embodiments, the dwell times are modified based on the number of unique RFID tags 12 detected by the RFID reader 31 and/or the centralized controller 16. In one example, if the number of unique RFID tags 12 exceeds a threshold number, the RFID reader 31 is configured to increase the dwell time(s) associated with the second query to provide additional time for the RFID reader 31 to interrogate the tracked RFID tags 12 and process the responses from those tags. In another example, there may be far fewer RFID tags 12 that are easy-to-read and therefore selected, so the RFID reader 31 may be configured to increase the dwell time(s) associated with the first query to provide additional time for the RFID reader 31 to interrogate the deselected RFID tags 12 and process the responses from those tags.

In the illustrated scenario, the selection command occurs within the read cycle after the second query that is configured to include a selection status indicator associated with the selected status. Thus, RFID tags 12 that respond to the second query must have had their selection status changed to the selected status in a previous read cycle. Consequently, the selection command does not immediately following the first query configured to include a selection status indicator associated with the deselected status. By making these two steps not consecutive, the processor in the RFID reader module 32 or the centralized controller 16 is provided additional time to build the list of RFID tag identifiers that were detected in the first query for inclusion in the mask by the selection command. While the list is created, the RFID reader 31 can execute the second query, maximizing system efficiency. As processing capabilities improve, the read cycle may be modified to broadcast the selection command between the first and second queries.

Figure 5A:
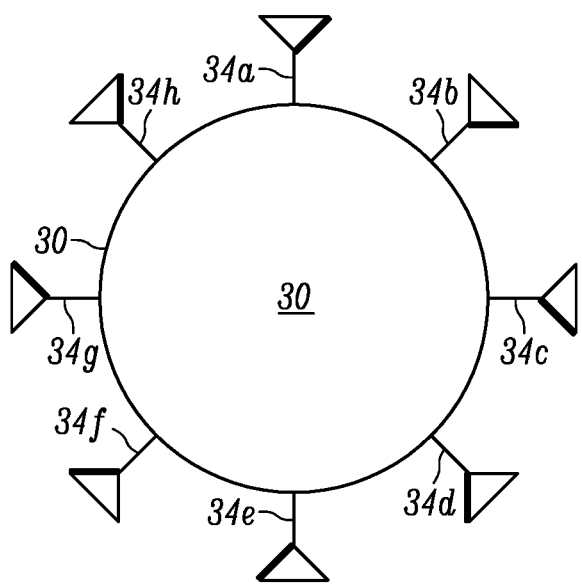
FIG. 5A is an illustration of an RFID reader of FIG. 3 that includes a plurality of radially distributed antennas.
Figure 5B:
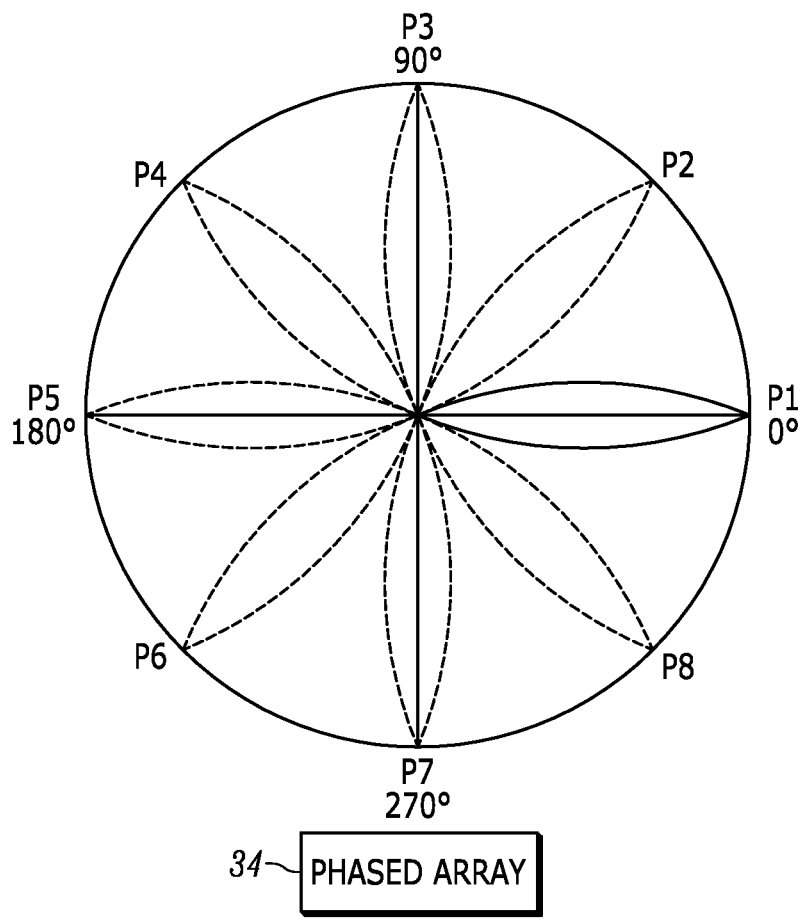
FIG. 5B is an illustration of an RFID reader of FIG. 3 that includes a phased-antenna array configured to implement a plurality of radially distributed virtual antennas.

In embodiments in which the RFID reader 31 includes a plurality of RFID antenna elements 34, the read cycle may also define a particular antenna utilized for each portion of the read cycle. Accordingly, FIGS. 5A-5B illustrate example arrangements of the plurality of RFID antenna elements 34 of the example detector station 30 of FIG. 3. More particularly, FIG. 5A illustrates an arrangement of physical RFID antenna elements 34 radially distributed within a housing of the detector station 30, and FIG. 5B illustrates an arrangement where the RFID antenna elements 34 are included in a phased antenna array configured to implement a plurality of radially distributed virtual antennas. It should be appreciated that the term "virtual antenna" is utilized with respect to FIG. 5B as there is not a physical antenna element located at radially distributed positions within the housing of the detector station 30. Instead, the phased antenna array is configured to steer a beam of RF energy generated by the phased antenna array at one of the positions P1-P8 radially oriented about the detector station 30. Accordingly, the term "virtual antenna" is used to refer to a position at which the phased antenna array steers (either mechanically or electronically) the beam of RF energy. It should be appreciated that while FIGS. 5A and 5B depict eight radially distributed antennas or virtual antennas, other arrangements may include any number of radially distributed antennas or virtual antennas.

With simultaneous reference to FIG. 4, the RFID reader 31 may be configured to use any of the RFID antenna elements 34a-h or the virtual antenna positioned at positions P1-P8 to perform each portion of the illustrated read cycle. For example, in the upper scenario, the RFID reader 31 may be configured to utilize the RFID antenna element 34a or the virtual antenna positioned at P3 to broadcast the first query for deselected RFID tags 12 while operating in Session/State 1A. Then, the RFID reader 31 may be configured to utilize the RFID antenna element 34b or the virtual antenna positioned at P2 to broadcast the second query while operating in Sessions 2 and 3. Finally, the RFID reader 31 may be configured to utilize the RFID antenna element 34c or the virtual antenna positioned at P1 to broadcast the selection command. As described earlier, broadcasting the selection command using a different, but nearby, antenna 34 than the one used to broadcast the first query increases the likelihood that only the easiest-to-read RFID tags 12 are selected. In some embodiments, the initial query of the second query and the subsequent query of the second query are also broadcasted over different antennas. For example, the RFID reader 31 may be configured to utilize the RFID antenna element 34b or the virtual antenna positioned at P2 to broadcast the initial query and the RFID antenna element 34c or the virtual antenna positioned at P1 to broadcast the subsequent query (as well as the select command).

In these embodiments, the RFID reader 31 is configured to rotate the set of RFID antenna elements 34 or virtual antennas utilized to execute the read cycle. In one example, the RFID reader 31 is configured to rotate each step of the read cycle one radial position for execution during the subsequent read cycle. In the above example, this means that during the second execution of the read cycle, the RFID reader 31 may be configured to utilize the RFID antenna element 34b or the virtual antenna positioned at P2 to broadcast the first query, the RFID antenna element 34c or the virtual antenna positioned at P1 to broadcast the second query, and the RFID antenna element 34d or the virtual antenna positioned at P8 to broadcast the selection command.

It should be appreciated that in the prior example, it may take several read cycles before the RF energy emitted from the RFID reader 31 completes a full sweep of the environment. If there are a sufficient number of radial positions, some RFID tags 12 may lose RF energy before the RFID reader 31 returns to a position that energized the RFID tags 12. Accordingly, to increase the rotational diversity between successive read cycles, the RFID reader 31 may be configured to utilize the next radially positioned RFID antenna element 34 or virtual antenna when executing the first step of the subsequent read cycle. In the above example, this means that during the second execution of the read cycle, the RFID reader 31 may be configured to utilize the RFID antenna element 34d or the virtual antenna positioned at P8 to broadcast the first query, the RFID antenna element 34e or the virtual antenna positioned at P7 to broadcast the second query, and the RFID antenna element 34f or the virtual antenna positioned at P6 to broadcast the selection command. In some embodiments, the number of different antennas utilized in any one read cycle and the overall number of RFID antenna elements or virtual antennas are compared to generate a read cycle such that each of the RFID antenna elements 34a-h or virtual antennas positioned at positions P1-P8 is capable of being the initial RFID antenna element 34 or virtual antenna in a read cycle.

In the embodiment that considers the eight RFID antenna elements 34 or virtual antennas in FIG. 5 in conjunction with the read cycle in the upper scenario of FIG. 4, the first read cycle may start with the first query using the RFID antenna element 34a or the virtual antenna positioned at P3. The initial query of the second query may use the RFID antenna element 34b or the virtual antenna positioned at P2, and the subsequent query of the second query may use the RFID antenna element 34c or the virtual antenna positioned at P1. The selection command may then use the RFID antenna element 34c or the virtual antenna positioned at P1, which is two radial positions away from the antenna used in the first query (i.e., RFID antenna element 34a or the virtual antenna positioned at P3), thus concluding this read cycle. The next read cycle may then start with the first query using the RFID antenna element 34*d* or the virtual antenna positioned at P8, which is the RFID antenna element, or the virtual antenna, adjacent to the RFID antenna element or virtual antenna, respectively, used for the subsequent query of the second query in the preceding read cycle. The initial query of the second query may then use the RFID antenna element 34*e* or the virtual antenna positioned at P7, and the subsequent query of the second query may use the RFID antenna element 34*f* or the virtual antenna positioned at P6. The selection command may then use the RFID antenna element 34*f* or the virtual antenna positioned at P6, which again is two radial positions away from the antenna used in the first query (i.e., RFID antenna element 34*d* or the virtual antenna positioned at P8), which concludes this read cycle. This pattern of read cycles continues six more times, wherein the last read cycle may start with the first query using the RFID antenna element 34*f* or the virtual antenna positioned at P6. The initial query of the second query may then use the RFID antenna element 34*g* or the virtual antenna positioned at P5, and the subsequent query of the second query may use the RFID antenna element 34*h* or the virtual antenna positioned at P4. The selection command may then use the RFID antenna element 34*h* or the virtual antenna positioned at P4, which again is two radial positions away from the antenna used in the first query (i.e., RFID antenna element 34*f* or the virtual antenna positioned at P6), thus concluding this read cycle. In this arrangement, the first and second queries cycle through the eight RFID antenna elements 34 or virtual antennas consecutively within each read cycle and between read cycles to evenly distribute the RF energy around a full 360° sweep, with the respective selection commands each using an RFID antenna element offset or virtual antenna offset from the RFID antenna element or virtual antenna used in the first query. In this arrangement, there are three revolutions around all eight RFID antenna elements 34*a-h*, where each RFID antenna element 34 or virtual antenna spends time broadcasting the first query, the second query, and the selection command.

In other embodiments, the RFID reader 31 may be configured to utilize all of the RFID antenna elements 34*a-h* simultaneously (or produce a beam pattern that emits a beam towards positions P1-P8 simultaneously). In these embodiments, the RFID reader 31 is able to track the entire sweep of the RF footprint in a single read cycle. As a tradeoff to support the multiple simultaneous RFID antenna elements 34 or virtual antennas, the RFID reader 31 may utilize less transmit power when broadcasting, making it more likely that only easy-to-read RFID tags 12 get selected. In these embodiments, the RFID reader 31 may be configured to transmit a plurality of first queries utilizing respective RFID antenna elements 34 or virtual antennas. In response, the RFID reader 31 may be configured to generate a list of RFID tag identifiers detected at each of the RFID antenna elements 34 or virtual antennas in response to each of the first queries. Accordingly, instead of transmitting a single selection command, the RFID reader 31 may be configured to transmit a plurality of selection commands simultaneously. More particularly, the list of RFID tag identifiers included in each selection command broadcasted by a particular RFID antenna element 34 or virtual antenna may have an offset angular position from the RFID antenna element 34 or virtual antenna that detected the response that included the RFID tag identifier. For example, the selection command broadcasted by the RFID antenna element 34*a* may include the list of RFID tag identifiers included in responses detected by the RFID antenna element 34*c*.

Figure 6:
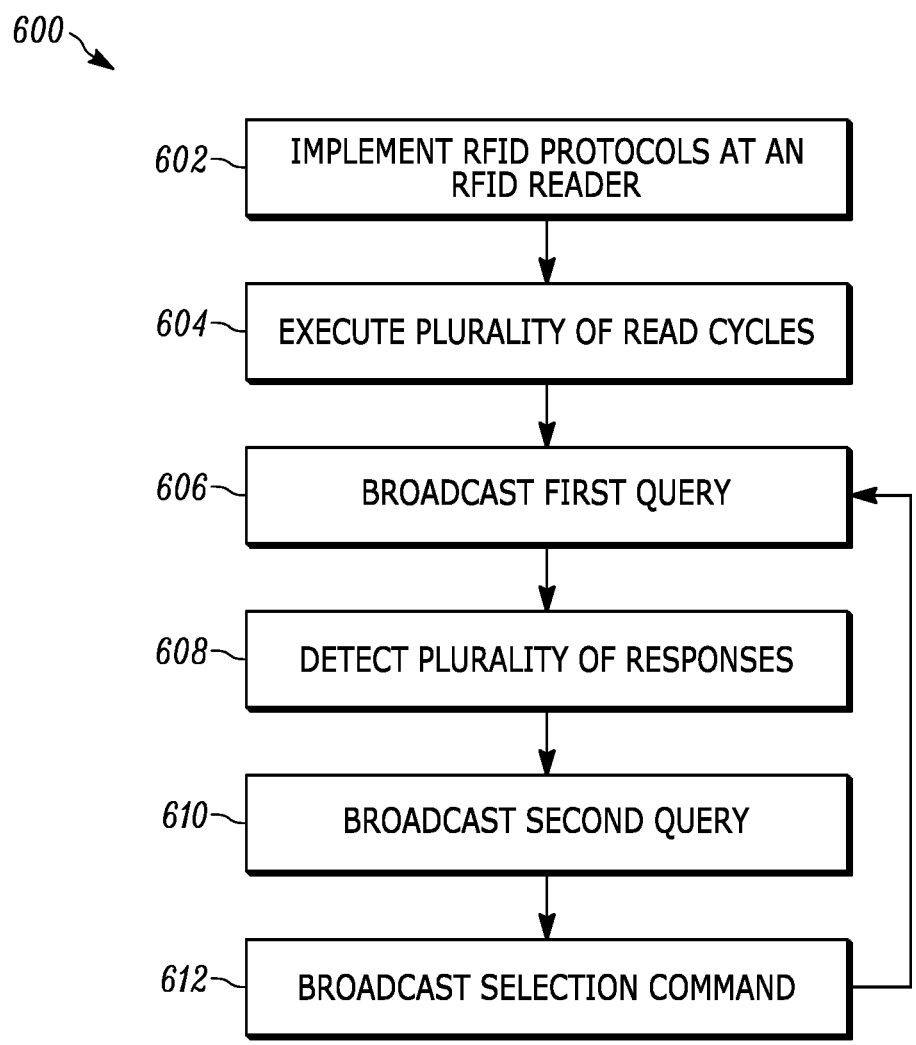
FIG. 6 is a flow chart of a method for managing a network of RFID readers, in accordance with an example embodiment.

FIG. 6 is a flow chart of a method 600 for managing a network of RFID readers 31 included in a plurality of detector stations 30, in accordance with an example embodiment. As described herein, the method 600 may be performed by an RFID reader 31 of a detector station 30 located at the venue 10. The method 600 may begin at block 602 when the RFID reader 31 implements one or more RFID protocols. In some embodiments, the RFID reader 31 is pre-configured with the implementation of the RFID protocols. Additionally or alternatively, the centralized controller 16 may push a software update to the RFID reader 31 that causes the RFID reader 31 to implement the RFID protocols.

At block 604, the RFID reader 31 is configured to execute a plurality of read cycles defined by the actions described with respect to blocks 606-612. In some embodiments, the centralized controller 16 may transmit one or more instructions to the RFID reader 31 that defines the particular actions of the read cycle. In some embodiments, the read cycle comprises a list or table stored in a memory of the RFID tag reader module 32 that includes an indication of which actions to perform at each step of the read cycle. For example, the read cycle may indicate a series of commands and/or queries to broadcast. If the particular action is a query, the read cycle may further indicate a particular protocol to utilize (e.g., the session and state), an indication of the selection status indicator to include in the query, and/or a dwell time during which the RFID reader 31 receives and processes responses. In some embodiments, the read cycle further includes an indication of the particular RFID antenna element 34 or virtual antenna for the RFID reader 31 to utilize when performing the action. Accordingly, to execute the read cycle, the RFID reader 31 may be configured to sequentially parse through and execute the list of actions included in the read cycle.

At block 606, during the read cycle, the RFID reader 31 is configured to broadcast a first query. In one embodiment, the first query uses the first protocol and a selection status indicator associated with the deselected status. For example, the RFID reader 31 may be configured to operate in Session/State 1A to broadcast a query for all RFID tags 12 associated with a deselected status. As described herein, the RFID reader 31 may be configured to broadcast the first query using a particular RFID antenna element 34 or virtual antenna indicated by the read cycle.

At block 608, during the read cycle, the RFID reader 31 is configured to detect a plurality of responses to the first query respectively corresponding to a plurality of RFID tags 12. To this end, each response may include an identifier (such as an EPC) associated with the responding RFID tag 12. The RFID reader 31 may generate a list or mask that includes an indication of each identifier received in a detected response.

At block 610, during the read cycle, the RFID reader 31 is configured to broadcast a second query. In accordance with an example embodiment, the second query uses the second and third protocols and a selection status indicator associated with the selected status. As described herein, the second query may include an initial query and a subsequent query. Accordingly, the RFID reader 31 may be configured to operate in a first one of Session 2 or Session 3 to broadcast the initial query and the other one of Session 2 or Session 3 to broadcast the subsequent query. Similarly, the RFID reader 31 may be configured to operate in a first one of State A or State B to broadcast the initial query and the other one of State A or State B to broadcast the subsequent query. Said another way, the RFID reader 31 may operate in any of the four combinations of Sessions 2 or 3 and States A or B to broadcast the initial query and the opposite combination of Sessions 2 or 3 and States A or B to broadcast the subsequent query. As described herein, the RFID reader 31 may be configured to broadcast the initial query and the subsequent query using particular RFID antenna elements 34 or virtual antennas indicated by the read cycle.

At block 612, during the read cycle, the RFID reader 31 is configured to broadcast a selection command. More particularly, the RFID reader 31 configures the selection command to include the list or mask of RFID tag identifiers generated at block 608. As a result, broadcasting the selection command causes RFID tags 12 that responded to the first query to switch their respective selection flag from the deselected status to the selected status. As described herein, the RFID reader 31 may be configured to broadcast the selection command using a particular RFID antenna element 34 or virtual antenna indicated by the read cycle.

The RFID reader 31 is then configured to return to block 606 to execute another read cycle. As described with respect to FIGS. 4-5, the RFID reader 31 may be configured to execute this read cycle using a different set of RFID antenna elements 34 or virtual antennas. In some embodiments, the list or table that includes an indication of which actions to perform at each step of the read cycle may include the set of actions for a plurality of sequentially executed read cycles. The RFID reader 31 may be configured to parse through the list of actions that defines the read cycle (or a plurality of sequentially-executed read cycles) until reaching the end; at which point, the RFID reader 31 begins executing the actions from the beginning of the list again.

In some embodiments, the RFID reader 31 and/or the centralized controller 16 may determine that a number of unique RFID tag identifiers received within a predetermined period of time exceeds a threshold value. In one example, the predetermined period is defined as a number of read cycles executed by the RFID reader 31. In this example, the number of unique RFID tag identifiers is determined based on the responses to the second query across one or more read cycles. In response, the RFID reader 31 may be configured to perform one or more actions to cause the plurality of RFID tags 12 to become deselected. In one example, the RFID reader 31 may be configured to execute one or more deselection cycles where the RFID reader 31 is configured to broadcast a deselection command to all RFID tags 12 within the RF footprint of the RFID reader 31. In another example, after the RFID reader 31 broadcasts the query with the selection status indicator associated with the selected status, a deselection command is broadcast to deselect the RFID tags 12 that responded to this query. In another example, the RFID reader 31 is configured to stop broadcasting RF energy for a timeout period that causes the RFID tags 12 to lose power. In response to any of these actions, the RFID tags 12 switch the selection flag from the selected status to the deselected status. In embodiments where the centralized controller 16 performs the determination that the threshold number of unique RFID tag identifiers is exceeded (such as by counting a number of unique records stored at the RFID tag database 56), the RFID reader 31 may be configured to receive an indication from the centralized controller 16 instructing the RFID reader 31 to perform the action(s) to cause the RFID tags 12 to switch their respective selection flags from the selected status to the deselected status.

It should be noted that there may be scenarios where a venue includes both high-density and low-density RFID tag environments. While the present disclosure describes systems and methods for managing a population of RFID tags 12 that are optimized for high-density RFID tag environments, the techniques described herein may be adapted for use in environments that may change between high-density and low-density RFID tag populations For example, in low-density RFID tag environments, the RFID readers 31 are more likely to process query responses fast enough when configuring the RFID readers 31 to implement known low-density RFID tag techniques is sufficient. Therefore, in order to make sure each RFID reader 31 is configured appropriately, the initial operation of each RFID reader 31 may include a period of time in a low-density mode. If a threshold number of unique RFID tag reads is met within a specified time period, then the RFID reader 31 may be reconfigured to implement the disclosed techniques. As a result, the RFID positioning system implements the systems and methods disclosed herein in all the areas where it is most useful (i.e., high-density RFID tag environments) without unnecessarily implementing the systems and methods disclosed herein where it may not be necessary (i.e., low-density RFID tag environments). Similarly, if an RFID reader 31 configured to implement the systems and methods disclosed herein determines that the number of unique RFID tag reads over a period of time falls below a specified threshold, then the RFID reader 31 may be reconfigured back to a low-density mode. In some scenarios, this dynamic reconfiguration occurs when a venue is remodeled and RFID tagged items in an area are replaced with other items that are not RFID tagged.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A system for managing a network of radio frequency identification (RFID) readers, the system comprising:
   a plurality of detector stations disposed throughout a venue, wherein each of the detector stations includes an RFID reader configured to:
   implement one or more RFID protocols, wherein:
      each protocol (i) is associated with a first state and a second state, and (ii) when an RFID tag responds to a query generated by the RFID reader, the RFID tag alternates between the first and second states,
      each RFID tag is configured with a selection flag that is associated with one of a selected status or a deselected status, and
      RFID tags respond to the query when a state of the queried RFID tag matches both a state of the RFID reader for the protocol queried and, if included in the query, a selection status indicator,
   the RFID protocols including:
      a first protocol where queried RFID tags in the matching state change to the other state for a duration of a timeout period and return to the matching state upon expiration of the timeout period; and
      a second protocol and a third protocol wherein RFID tags in the matching state change to the other state until (1) queried by an RFID reader in the other state, or (2) when the queried RFID tag is in the second state and the queried RFID tag loses RF power for a threshold duration; and
   execute a plurality of read cycles, wherein during each read cycle, the RFID reader is configured to:
      broadcast a first query using the first protocol and a selection status indicator associated with the deselected status;
      detect a plurality of responses to the first query respectively corresponding to a plurality of RFID tags, wherein each response includes an identifier associated with the responding RFID tag;
      broadcast a second query using the second and third protocols and a selection status indicator associated with the selected status; and
      broadcast a selection command, wherein the selection command causes RFID tags that responded to the first query to switch their respective selection flag from the deselected status to the selected status.

2. The system of claim 1, wherein to broadcast the second query using the second and the third protocols, the RFID reader is configured to:
   broadcast an initial query using the second protocol then broadcast a subsequent query using the third protocol, or
   broadcast an initial query using the third protocol then broadcast a subsequent query using the second protocol.

3. The system of claim 2, wherein the plurality of detector stations form an alternating pattern comprised of:
   a first set of detector stations including respective RFID readers configured to broadcast the second query using the second and the third protocols by broadcasting the initial query using the second protocol then broadcasting the subsequent query using the third protocol; and
a second set of detector stations including respective RFID readers configured to broadcast the second query using the second and the third protocols by broadcasting the initial query using the third protocol then broadcasting the subsequent query using the second protocol.

4. The system of claim 3, wherein:
the initial query for the first set of detector stations is configured to indicate the second state, and
the subsequent query for the first set of detector stations is configured to indicate the first state.

5. The system of claim 3, wherein:
the initial query for the first set of detector stations is configured to indicate the first state, and
the subsequent query for the first set of detector stations is configured to indicate the second state.

6. The system of claim 3, wherein:
the initial query for the second set of detector stations is configured to indicate the second state, and
the subsequent query for the second set of detector stations is configured to indicate the first state.

7. The system of claim 3, wherein:
the initial query for the second set of detector stations is configured to indicate the first state, and
the subsequent query for the second set of detector stations is configured to indicate the second state.

8. The system of claim 1, wherein the RFID reader is configured to have a plurality of antennas radially distributed within a housing of the detector station.

9. The system of claim 8, wherein to broadcast the selection command, the RFID reader is configured to:
identify a particular antenna of the plurality of antennas via which a response from a particular RFID tag to the first query was received; and
broadcast the selection command using an antenna other than the particular antenna of the plurality of antennas.

10. The system of claim 8, wherein the first query includes a plurality of first queries respectively broadcasted by each of the plurality of antennas, and wherein to broadcast the selection command, the RFID reader is configured to:
determine a plurality of identifiers included in a plurality of responses detected by each of the plurality of antennas in response to each of the first queries; and
broadcast a plurality of selection commands, wherein each antenna that broadcasts the selection command has an offset angular position relative to the antenna that detected the plurality of responses to each of the first queries.

11. The system of claim 1, wherein the RFID reader includes a phased antenna array forming a plurality of radially distributed virtual antennas, wherein to broadcast the selection command, the RFID reader is configured to: identify a particular virtual antenna of the plurality of virtual antennas via which a response from a particular RFID tag to the first query was received; and broadcast the selection command using a virtual antenna other than the particular virtual antenna of the plurality of virtual antennas.

12. The system of claim 1, wherein the RFID reader includes a phased antenna array forming a plurality of radially distributed virtual antennas, wherein the first query includes a plurality of first queries respectively broadcasted by each of the plurality of virtual antennas, and wherein to broadcast the selection command, the RFID reader is configured to:
determine a plurality of identifiers included in a plurality of responses detected by each of the plurality of virtual antennas in response to each of the first queries; and
broadcast a plurality of selection commands, wherein each virtual antenna that broadcasts the selection command has an offset angular position relative to the virtual antenna that detected the plurality of responses to each of the first queries.

13. The system of claim 1, wherein the RFID reader is configured to:
determine that a number of unique RFID tags read in response to the second query across one or more of the plurality of read cycles exceeds a threshold number of unique RFID tags; and
in response to the determination, execute one or more deselection cycles.

14. The system of claim 13, wherein to execute the deselection cycle, the RFID reader is configured to:
broadcast a deselection command to all RFID tags within an RF footprint of the RFID reader.

15. The system of claim 13, wherein to execute the deselection cycle, the RFID reader is configured to:
broadcast the second query using the second and third protocols and the selection status indicator associated with the selected status;
detect a plurality of responses to the second query; and
broadcast a deselection command, wherein the deselection command causes RFID tags that responded to the second query to switch their respective selection flag from the selected status to the deselected status.

16. The system of claim 1, wherein the RFID reader is configured to:
determine that a number of unique RFID tags read in response to the second query across one or more of the plurality of read cycles exceeds a threshold number of unique RFID tags; and
in response to the determination, stop broadcasting RF energy for a duration of a timeout period causing RFID tags that responded to the second query to switch their respective selection flag from the selected status to the deselected status.

17. A method for managing a network of detector stations that each include a radio frequency identification (RFID) reader, the plurality of detector stations disposed throughout a venue, the method comprising:
implementing, at an RFID reader of a detector station, one or more RFID protocols, wherein:
each protocol (i) is associated with a first state and a second state, and (ii) when an RFID tag responds to a query generated by the RFID reader, the RFID tag alternates between the first and second states,
each RFID tag is configured with a selection flag that is associated with one of a selected status or a deselected status, and
RFID tags respond to the query when a state of the queried RFID tag matches both a state of the RFID reader for the protocol queried and, if included in the query, a selection status indicator,
the RFID protocols including:
a first protocol where queried RFID tags in the matching state change to the other state for a duration of a timeout period and return to the matching state upon expiration of the timeout period; and
a second protocol and a third protocol wherein RFID tags in the matching_state change to the other state until (1) queried by an RFID reader in the other state, or (2) when the queried RFID tag is in the second state and the queried RFID tag loses RF power for a threshold duration; and executing a plurality of read cycles comprising the steps of:
broadcasting a first query using the first protocol and a selection status indicator associated with the deselected status;
detecting a plurality of responses to the first query respectively corresponding to a plurality of RFID tags, wherein each response includes an identifier associated with the responding RFID tag;
broadcasting a second query using the second and third protocols and a selection status indicator associated with the selected status; and
broadcasting a selection command, wherein the selection command causes RFID tags that responded to the first query to switch their respective selection flag from the deselected status to the selected status.

18. The method of claim 17, wherein broadcasting the second query using the second and the third protocols comprises:
broadcasting an initial query using the second protocol then broadcasting a subsequent query using the third protocol, or
broadcasting an initial query using the third protocol then broadcasting a subsequent query using the second protocol.

19. The method of claim 18, further comprising:
configuring the initial query to indicate the second state, and
configuring the subsequent query to indicate the first state.

20. The method of claim 18, further comprising:
configuring the initial query to indicate the first state, and
configuring the subsequent query to indicate the second state.

21. The method of claim 17, wherein the RFID reader is configured to have a plurality of antennas radially distributed within a housing of the detector station.

22. The method of claim 21, wherein broadcasting the selection command comprises:
identifying a particular antenna of the plurality of antennas via which a response from a particular RFID tag to the first query was received; and
broadcasting the selection command using an antenna other than the particular antenna of the plurality of antennas.

23. The method of claim 21, wherein the first query includes a plurality of first queries respectively broadcasted by each of the plurality of antennas, and wherein broadcasting the selection command comprises:
determining a plurality of identifiers included in a plurality of responses detected by each of the plurality of antennas in response to each of the first queries; and
broadcasting a plurality of selection commands wherein each antenna that broadcasts the selection command has an offset angular position relative to the antenna that detected the plurality of responses to each of the first queries.

24. The method of claim 17, wherein the RFID reader is configured to have a phased antenna array consisting of a plurality of radially distributed virtual antennas, wherein broadcasting the selection command comprises: identifying a particular virtual antenna of the plurality of virtual antennas via which a response from a particular RFID tag to the first query was received; and broadcasting the selection command using a virtual antenna other than the particular virtual antenna of the plurality of virtual antennas.

25. The method of claim 17, wherein the RFID reader is configured to have a phased antenna array consisting of a plurality of radially distributed virtual antennas, wherein the first query includes a plurality of first queries respectively broadcasted by each of the plurality of virtual antennas, and wherein broadcasting the selection command, comprises:
determining a plurality of identifiers included in a plurality of responses detected by each of the plurality of virtual antennas in response to each of the first queries; and
broadcasting a plurality of selection commands, wherein each virtual antenna that broadcasts the selection command has an offset angular position relative to the virtual antenna that detected the plurality of responses to each of the first queries.

26. The method of claim 17, further comprising:
determining that a number of unique RFID tags read in response to the second query across one or more of the plurality of read cycles exceeds a threshold number of unique RFID tags; and
in response to the determination, executing one or more deselection cycles.

27. The method of claim 26, executing the deselection cycle comprises:
broadcasting a deselection command to all RFID tags within an RF footprint of the RFID reader.

28. The method of claim 26, executing the deselection cycle comprises:
broadcasting the second query using the second and third protocols and the selection status indicator associated with the selected status;
detecting a plurality of responses to the second query; and
broadcasting a deselection command wherein the deselection command causes RFID tags that responded to the second query to switch their respective selection flag from the selected status to the deselected status.

29. The method of claim 17, further comprising:
determining that a number of unique RFID tags read in response to the second query across one or more of the plurality of read cycles exceeds a threshold number of unique RFID tags; and
in response to the determination, stopping to broadcast RF energy for a duration of a timeout period to cause RFID tags that responded to the second query to switch their respective selection flag from the selected status to the deselected status.

* * * * *